(12) United States Patent
Balaji et al.

(10) Patent No.: US 12,041,373 B2
(45) Date of Patent: Jul. 16, 2024

(54) APPLYING VIDEO EFFECTS WITHIN A VIDEO COMMUNICATION SESSION

(71) Applicant: Zoom Video Communications, Inc., San Jose, CA (US)

(72) Inventors: Abhishek Balaji, San Jose, CA (US); Anna Deng, San Jose, CA (US); Chichen Fu, San Jose, CA (US); Pei Li, San Jose, CA (US); Bo Ling, Saratoga, CA (US); Juliana Park, San Francisco, CA (US); Qiang Li, Zhejiang (CN); Wenchong Lin, Zhejiang (CN)

(73) Assignee: Zoom Video Communications, Inc., San Jose, CA (US)

( * ) Notice: Subject to any disclaimer, the term of this patent is extended or adjusted under 35 U.S.C. 154(b) by 0 days.

(21) Appl. No.: 17/390,909

(22) Filed: Jul. 31, 2021

(65) Prior Publication Data

US 2023/0007189 A1    Jan. 5, 2023

(30) Foreign Application Priority Data

Jul. 1, 2021    (CN) .......................... 202110743213.3

(51) Int. Cl.
*H04N 5/262* (2006.01)
*H04N 5/272* (2006.01)
*H04N 7/15* (2006.01)

(52) U.S. Cl.
CPC .......... *H04N 5/2621* (2013.01); *H04N 5/272* (2013.01); *H04N 7/157* (2013.01); *H04N 2005/2726* (2013.01)

(58) Field of Classification Search
None
See application file for complete search history.

(56) References Cited

U.S. PATENT DOCUMENTS

| 9,391,934 B2 * | 7/2016 | Langholz ............. H04L 51/066 |
| 11,169,675 B1 * | 11/2021 | Anvaripour ............ H04L 51/52 |
| 2013/0141515 A1 | 6/2013 | Setton |

(Continued)

OTHER PUBLICATIONS

International Search Report and Written Opinion dated Nov. 2, 2022 in corresponding PCT Application No. PCT/US2022/035880.

*Primary Examiner* — Heather R Jones
(74) *Attorney, Agent, or Firm* — Young Basile Hanlon & MacFarlane, P.C.

(57) ABSTRACT

Methods and systems provide for applying a video effect to a video corresponding to a participant within a video communication session. The system displays a video for each of at least a subset of the participants and a user interface including a selectable video effects UI element. The system receives a selection by a participant of the video effects UI element. In response to receiving the selection, the system displays a variety of video effects options for modifying the appearance of the video and/or modifying a visual representation of the participant. The system then receives a selection by the participant of a video effects option, and further receives a subselection for customizing the amount of the video effect to be applied. The system then applies, in real time or substantially real time, the selected video effect in the selected amount to the video corresponding to the participant.

20 Claims, 14 Drawing Sheets

(56) References Cited

U.S. PATENT DOCUMENTS

| | | | |
|---|---|---|---|
| 2015/0234564 A1* | 8/2015 | Snibbe | G06T 11/60 715/716 |
| 2016/0202882 A1* | 7/2016 | Mortillaro | G06T 13/80 715/719 |
| 2018/0012390 A1 | 1/2018 | Deng et al. | |
| 2018/0075523 A1* | 3/2018 | Sartori Odizzio | G06Q 30/0643 |
| 2018/0184171 A1* | 6/2018 | Danker | H04N 5/272 |
| 2019/0342507 A1 | 11/2019 | Dye et al. | |
| 2020/0267349 A1 | 8/2020 | Garrido et al. | |
| 2021/0158021 A1 | 5/2021 | Wu et al. | |
| 2022/0070385 A1* | 3/2022 | Van Os | H04N 5/2621 |
| 2022/0157342 A1* | 5/2022 | Kliushkin | G11B 27/036 |

* cited by examiner

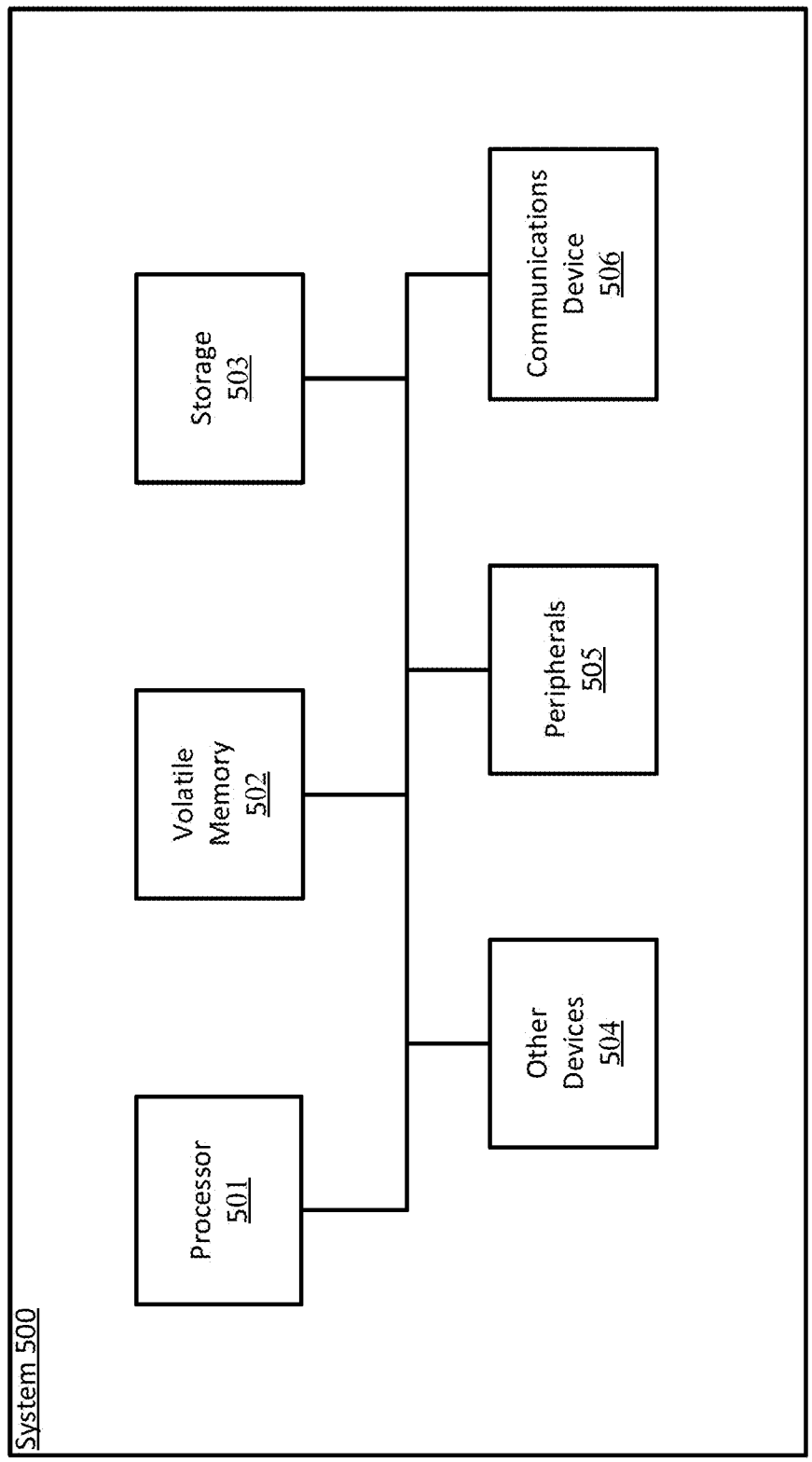

APPLYING VIDEO EFFECTS WITHIN A VIDEO COMMUNICATION SESSION

FIELD OF INVENTION

The present invention relates generally to digital communication, and more particularly, to systems and methods for applying video effects to videos of participants within a video communication session.

BACKGROUND

Digital communication tools and platforms have been essential in providing the ability for people and organizations to communicate and collaborate remotely, e.g., over the internet. In particular, there has been massive adopted use of video communication platforms allowing for remote video sessions between multiple participants. Video communications applications for casual friendly conversation ("chat"), webinars, large group meetings, work meetings or gatherings, asynchronous work or personal conversation, and more have exploded in popularity.

With the ubiquity and pervasiveness of remote video conversations, users of such video communication platforms frequently find themselves in back-to-back scheduled meetings, often involving the same participants seeing each other in multiple meetings throughout the day. This may be especially pronounced for those who rely heavily on n such video platforms during remote work. Some users report a sense of monotony in seeing the same users in meetings frequently, sometimes for long stretches. In some cases, there has also been a reluctance on the part of some users to enable video of themselves to be broadcasted during such sessions. When users opt to disable video from being transmitted, there can be an increased sense of monotony during a video session, as well as a lack of intimacy or connection between participants, whether the session is business-oriented or casual.

Within some video-based social media networks, users have the ability to alter their physical appearance within a video that gets uploaded and shared within the social media network. For example, users may be able to "wear" a pair of virtual glasses, which appears on the video watched by others. Users may also be able to apply various filters to the video, such as a sepia tone which is applied to the entire video. These modifications and adjustments are intended for videos which are to be uploaded and viewed later by other users, so there is no processing limitation requiring the modifications to be seen by others in real time or substantially real time.

In addition, much of the content in these services is designed to be short form content (e.g., 1-minute videos) or ephemeral content that may not be archived indefinitely, but is intended to become unavailable after some time. As such, these efforts applied a very obvious and bold effect that was designed for short, momentary video content. They also did not allow users a greater degree of customization, including the ability to adjust the intensity or opacity of the effect being applied, adjust color and/or style, and other aspects. They also did not allow users to adopt more subtle effects which may allow users to feel more comfortable enabling their video during a session by providing a slight enhancement rather than a bold, brash effect.

Finally, these previous efforts did not allow users to provide their own customized effects, nor did they allow third party effects to be used through an extensible system of contributing effects.

Thus, there is a need in the field of digital communication tools and platforms to create a new and useful system and method for applying video effects to videos of participants within a video communication session. The source of the problem, as discovered by the inventors, is a lack of ability to provide video effects which are applied in real time or substantially real time in live video feeds, while providing users with the ability to customize and adjust aspects of the effects to provide a more subtle overall effect meant for longform viewing.

SUMMARY

The invention overcomes the existing problems by enabling the ability for participants within a video communication session to apply video effects to their video to be shown to other participants. Such video effects may be filters applied to videos, accessories applied to the head of a participant, feature changes to the face of a participant, frames or borders applied to the perimeters of videos, and more. Users of a video communication platform may go into a settings interface to adjust various settings of the video they are broadcasting to other participants within a video session. Within these settings, users are provided with options to adjust video filters, studio effects, and/or other effects. For some effects, users are then provided with secondary options to adjust an opacity or intensity of the effect along a slider UI element.

Such options address the reluctance of many users to enable video during sessions due to a perceived lack of preparation in appearing presentable before the camera. Rather than choosing between no effect or a full 100% intense effect, users can instead use the slider to granularly adjust the extent to which the effect is applied.

Such options also address the monotony which can result from, e.g., remote workers having back-to-back meetings with the same users. A remote worker can "change" the color of his shirt, or add some subtle facial feature or other slight variations to appear different from meeting to meeting.

In one embodiment, the system displays, for a number of participants within a video communication session, a video for each of at least a subset of the participants and a user interface (UI), the UI comprising a selectable video effects UI element. The system receives a selection by a participant of the video effects UI element. In response to receiving the selection, the system displays a variety of video effects options for modifying the appearance of the video corresponding to the participant and/or modifying a visual representation of the participant within the video. The system then receives a selection by the participant of a video effects option from the plurality of video effects options, and further receives a subselection for customizing at least the amount of the video effect to be applied. The system then applies, in real time or substantially real time, the selected video effect in the selected amount to the video corresponding to the participant.

In varying embodiments, video effects options can include, for example: inserting a frame and/or border around the perimeter of the video corresponding to the participant; adding one or more accessories or features to the visual representation of the participation within the video; a depth of effect or opacity amount for the video effect to be applied in real time or substantially real time; and a color or hue filter to the video corresponding to the participant.

In some embodiments, a hand can be detected in front of the applied video effect, and then the selected video effect can be adjusted in real time or substantially real time such that the hand appears over the video effect. In some embodiments, the participant can select the applied video effect to be applied to all future video communication sessions, or to be applied to all future recurring video communication sessions in a recurring series of video communication sessions.

In some embodiments, the system further receives one or more additional selections by the participant of one or more additional video effects from the plurality of video effects, and receives one or more subselections for customizing at least the amount of the one or more additional video effects to be applied. The system then applies, in real time or substantially real time, the one or more selected additional video effects in the selected amount to the video corresponding to the participant such that the additional video effects are presented concurrently to the selected video effect.

Further areas of applicability of the present disclosure will become apparent from the detailed description, the claims and the drawings. The detailed description and specific examples are intended for illustration only and are not intended to limit the scope of the disclosure.

BRIEF DESCRIPTION OF THE DRAWINGS

The present invention relates generally to digital communication, and more particularly, to systems and methods providing for containment of sensitive data within a communication or messaging platform.

The present disclosure will become better understood from the detailed description and the drawings, wherein:

FIG. 5 is a diagram illustrating an exemplary computer that may perform processing in some embodiments.

DETAILED DESCRIPTION

Figure 1A:
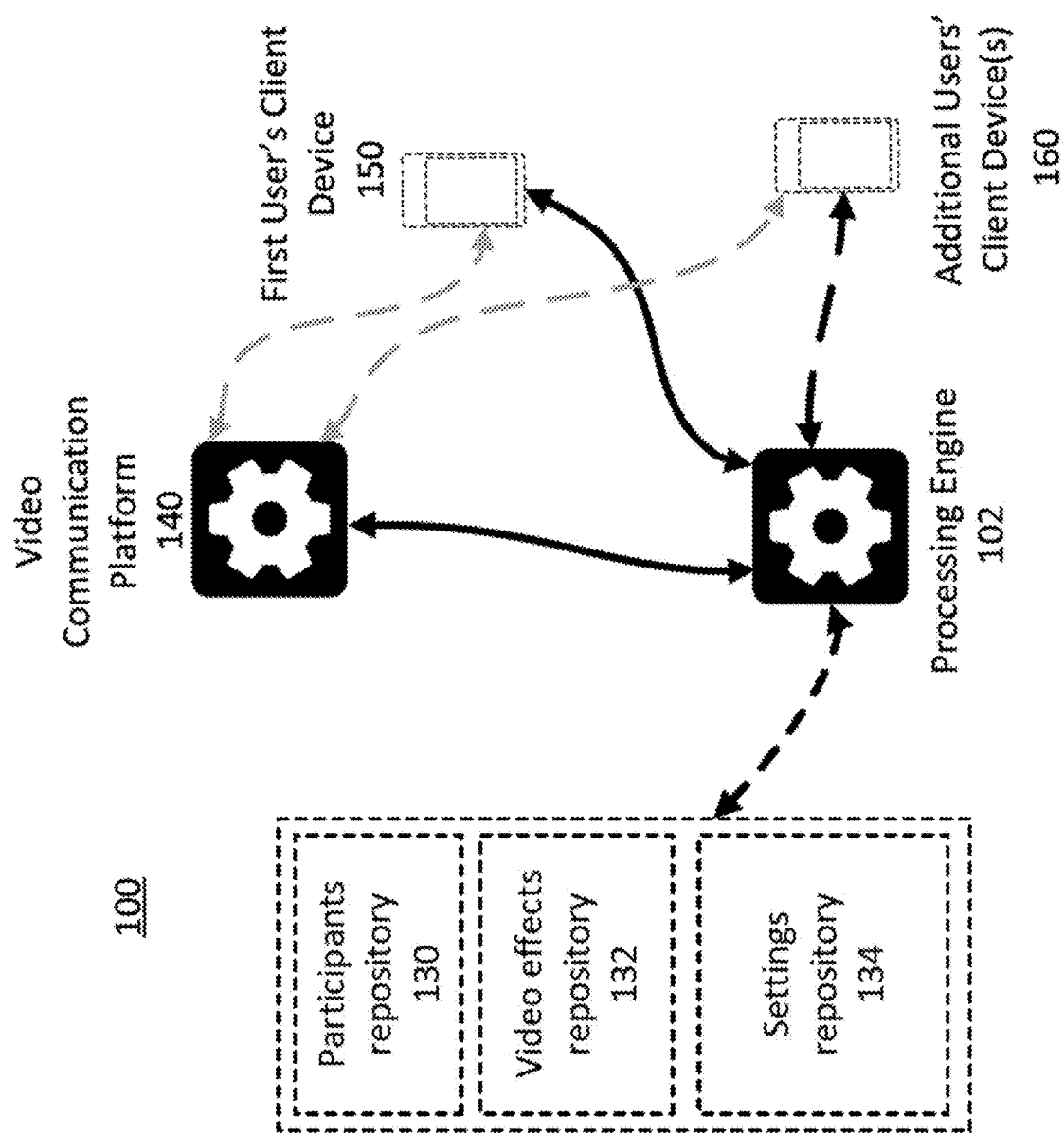
FIG. 1A is a diagram illustrating an exemplary environment in which some embodiments may operate.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

By way of illustration, coworkers in a remote work environment may have scheduled back-to-back meetings throughout an afternoon in which they will all be seeing and interacting with each other. When such meeting-filled days occur, some of the coworkers joke about seeing each other again for the 4th hour in a row, while other coworkers wish they could wear something different or wish they had prepared a bit more to look more presentable in videos throughout the day. Susan regrets not having enough time in the morning to fix her hair properly, while Peter stopped enabling his video after the second meeting because he did not see a point in keeping video on.

With the present approach, however, each of the coworkers is able to select video effects from a variety of different options. These video effects function to modify the appearance of the video that the participant is streaming from their device, modify a visual representation of the participant within the streaming video, or both. In addition, participants can select, via a slider or similar UI element, the amount of the modification to appear within the video, which allows for anything from subtle video effects to exaggerated ones if desired, or anything in between. The effects are then applied in real time or substantially real time, leading to the effect instantly taking affect when seen by fellow coworkers. This helps to break up the monotony of back-to-back meetings with the same or similar participants, encourages users to keep their video streams enabled, and aids users in light touch-ups of appearance so that they feel more comfortable and presentable on a video stream.

For example, even though Susan did not have time to fix her hair properly, she has some options for video effects which can conceal this to her coworkers. She may opt to choose a hat from the available video effects options, and may choose between either a silly hat that will make coworkers laugh, or a nice-looking one that frames her face nicely. She can also choose a color for the hat that matches with her shirt. She may additionally or alternatively opt to select a hairstyle from the video effects options to present herself as wearing a virtual wig. She can choose from a variety of hairstyles and colors. Both the options of a customized hat and a customized wig are ones that make Susan feel more presentable and more confident when she needs to be on video with coworkers all day long. She may also add a slight amount of virtual blush to her cheeks in the video, and the opacity slider for the effect allows her to dial in a subtle amount to her desire. Meanwhile, instead of Peter disabling his video after the second meeting with coworkers, he keeps the video enabled, but changes his appearance from one meeting to the next. In one meeting, he may wear sunglasses and a goatee, while in another meeting, he may opt for a beret and a moustache. He can also change other elements of the video, such as the border of the video or virtual background, to something funny or striking. He keeps his video enabled because he is interested in seeing what his coworkers change in their video streams, as well as in changing his own video stream to keep things entertaining and unpredictable.

I. Exemplary Environments

FIG. 1A is a diagram illustrating an exemplary environment in which some embodiments may operate. In the exemplary environment 100, a first user's client device 150 and one or more additional users' client device(s) 160 are connected to a processing engine 102 and, optionally, a communication platform 140. The processing engine 102 is connected to the communication platform 140, and optionally connected to one or more repositories and/or databases, including a participants repository 130, video effects repository 132, and/or a settings repository 134. One or more of the databases may be combined or split into multiple databases. The first user's client device 150 and additional users' client device(s) 160 in this environment may be computers, and the video communication platform 140 and processing engine 102 may be applications or software hosted on a computer or multiple computers which are communicatively coupled via remote server or locally.

The exemplary environment 100 is illustrated with only one additional user's client device, one processing engine, and one communication platform, though in practice there may be more or fewer additional client devices, processing engines, and/or video communication platforms. In some embodiments, the client device(s), processing engine, and/or communication platform may be part of the same computer or device.

Figure 2:
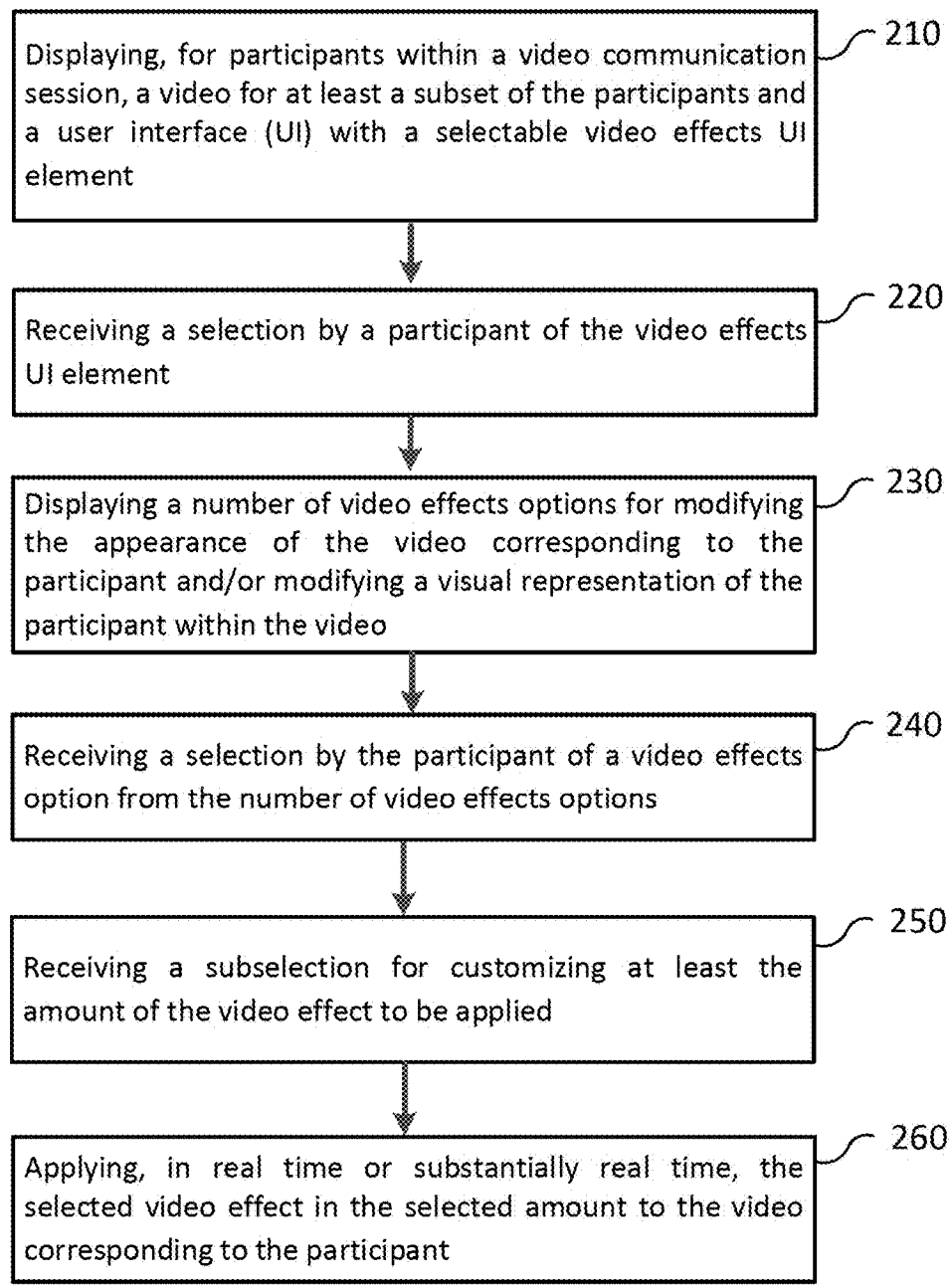
FIG. 2 is a flow chart illustrating an exemplary method that may be performed in some embodiments.
Figure 3:
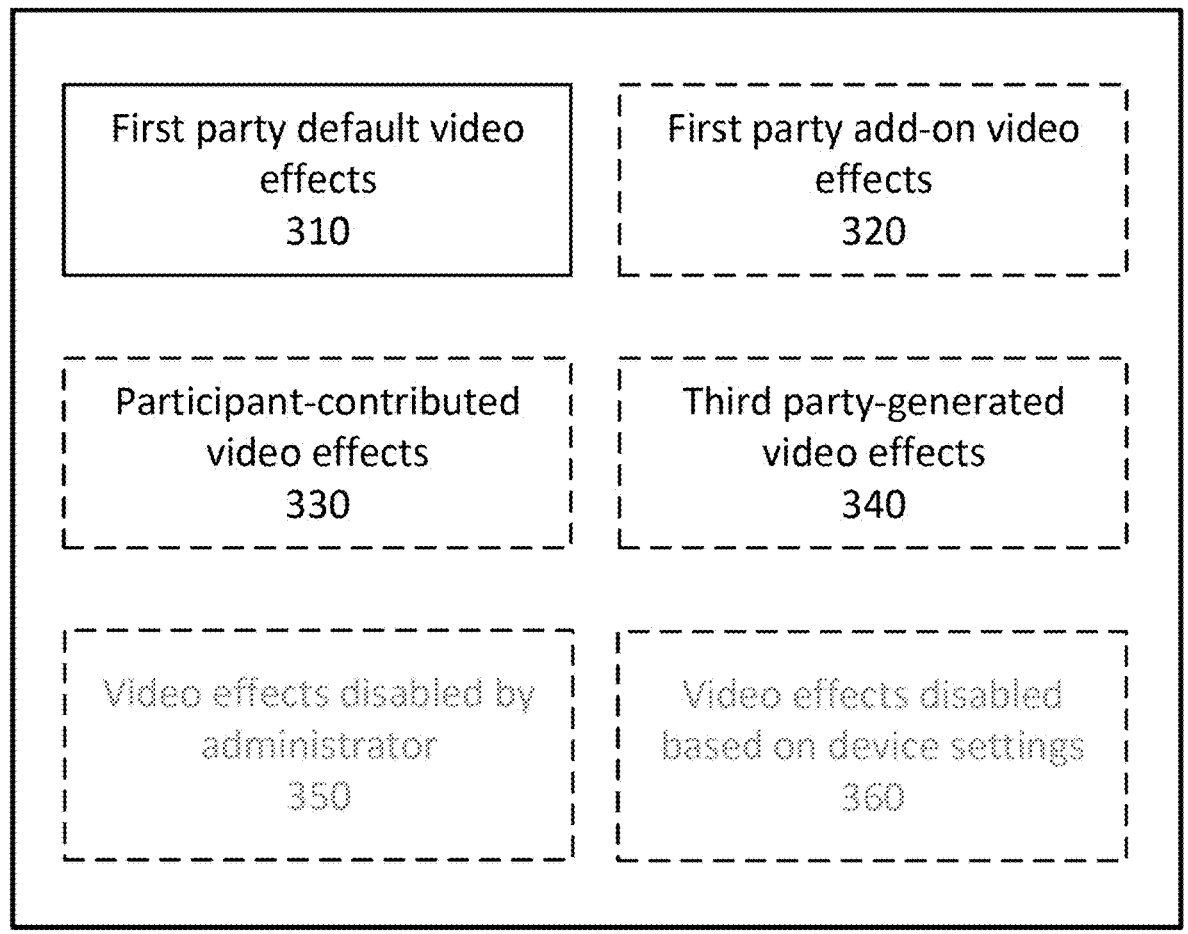
FIG. 3 is a flow chart illustrating an exemplary embodiment of video effects options within a video communication session, according to some embodiments.

In an embodiment, the processing engine 102 may perform the exemplary method of FIG. 2, the exemplary method of FIG. 3, or other method herein and, as a result, provide the ability for users to apply video effects to their videos during a video communication session. In some embodiments, this may be accomplished via communication with the first user's client device, additional users' client device(s), processing engine, communication platform, and/or other device(s) over a network between the device(s) and an application server or some other network server. In some embodiments, the processing engine 102 is an application, browser extension, or other piece of software hosted on a computer or similar device, or is itself a computer or similar device configured to host an application, browser extension, or other piece of software to perform some of the methods and embodiments herein.

The first user's client device 150 and additional users' client device(s) 160 are devices with a display configured to present information to a user of the device. In some embodiments, the client devices present information in the form of a user interface (UI) with multiple selectable UI elements or components. In some embodiments, the client devices 150 and 160 are configured to send and receive signals and/or information to the processing engine 102 and/or video communication platform 140. In some embodiments, the client devices are computing devices capable of hosting and executing one or more applications or other programs capable of sending and/or receiving information. In some embodiments, the client device may be a computer desktop or laptop, mobile phone, virtual assistant, virtual reality or augmented reality device, wearable, or any other suitable device capable of sending and receiving information. In some embodiments, the processing engine 102 and/or communication platform 140 may be hosted in whole or in part as an application or web service executed on the client devices 150 and/or 160. In some embodiments, one or more of the communication platform 140, processing engine 102, and client devices 150 and 160 may be the same device. In some embodiments, the first user's client device 150 is associated with a first user account within a video platform, and the additional users' client device(s) 160 are associated with additional user account(s) within a video platform.

In some embodiments, optional repositories can include one or more of a participants repository 130, video effects repository 132, and/or settings repository 134. The optional repositories function to store and/or maintain, respectively, participant information associated with a video communication session on the communication platform 140, selectable video effects options within the video communication session, and settings of the video communication session. The optional database(s) may also store and/or maintain any other suitable information for the processing engine 102 or communication platform 140 to perform elements of the methods and systems herein. In some embodiments, the optional database(s) can be queried by one or more components of system 100 (e.g., by the processing engine 102), and specific stored data in the database(s) can be retrieved.

Communication platform 140 is a platform configured to facilitate video communication between two or more parties, such as within a conversation, video conference or meeting, message board or forum, virtual meeting, or other form of digital communication. The video communication session may be one-to-many (e.g., a speaker presenting to multiple attendees), one-to-one (e.g., two friends speaking with one another), or many-to-many (e.g., multiple participants speaking with each other in a group video setting).

Figure 1B:
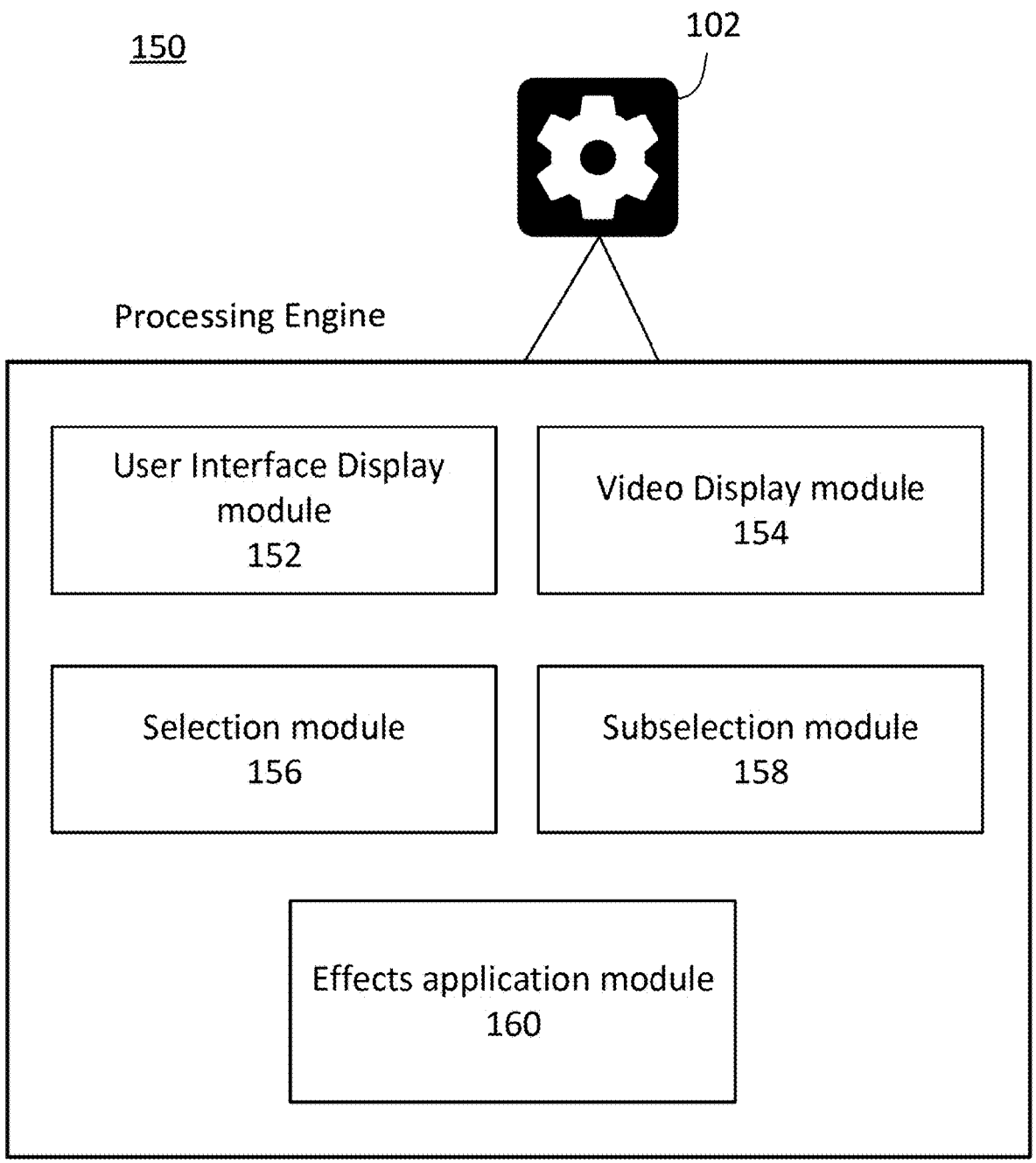
FIG. 1B is a diagram illustrating an exemplary computer system that may execute instructions to perform some of the methods herein.

FIG. 1B is a diagram illustrating an exemplary computer system 150 with software modules that may execute some of the functionality described herein.

User interface display module 152 functions to display a UI for each of the participants within the video communication session, including at least a video for each of at least a subset of the participants and a user interface ("UI"), the UI consisting of a selectable video effects UI element.

Video display module 154 functions to display the videos for at least a subset of the participants, which may appear as live video feeds for each participant with video enabled.

Selection module 156 functions to receive, from a client device, a selection of a video effects UI element from a participant of the video communications session.

Subselection module 158 functions to receive a subselection for customizing an amount of the video effect to be applied.

Effects application module 160 function to apply, in real time or substantially real time, the selected video effect in the selected amount to the video corresponding to the participant.

The above modules and their functions will be described in further detail in relation to an exemplary method below.

II. Exemplary Method

FIG. 2 is a flow chart illustrating an exemplary method that may be performed in some embodiments.

At step 202, the system displays a UI for each of a plurality of participants within a video communication session, as well as a video for each of at least a subset of the participants. The UI includes at least a selectable video effects UI element. In some embodiments, the UI also includes participant windows corresponding to participants. In some embodiments, the video for each of at least a subset of the participants is displayed within the corresponding participant window for that participant.

The UI to be displayed relates to the video communication platform 140, and may represent a "video window", such as a window within a GUI that displays a video between a first participant, with a user account within the video platform, and one or more other user accounts within the video platform. The first participant is connected to the video communication session via a client device. The UI includes a number of selectable UI elements. For example, one UI may present selectable UI elements along the bottom of a communication session window, with the UI elements representing options the participant can enable or disable within the video session, settings to configure, and more. For example, UI elements may be present for, e.g., muting or unmuting audio, stopping or starting video of the participant, sharing the participant's screen with other participants, recording the video session, and/or ending the video session. In some embodiments, an option to select a settings UI to navigate to is included among these selectable UI elements.

One included UI element is a settings UI element. When a participant selects this UI element, the system presents him with a settings UI section, which may be a window or pop-up element of the UI. In some embodiments, the settings UI has a number of selectable UI elements in a sidebar.

Figure 4A:
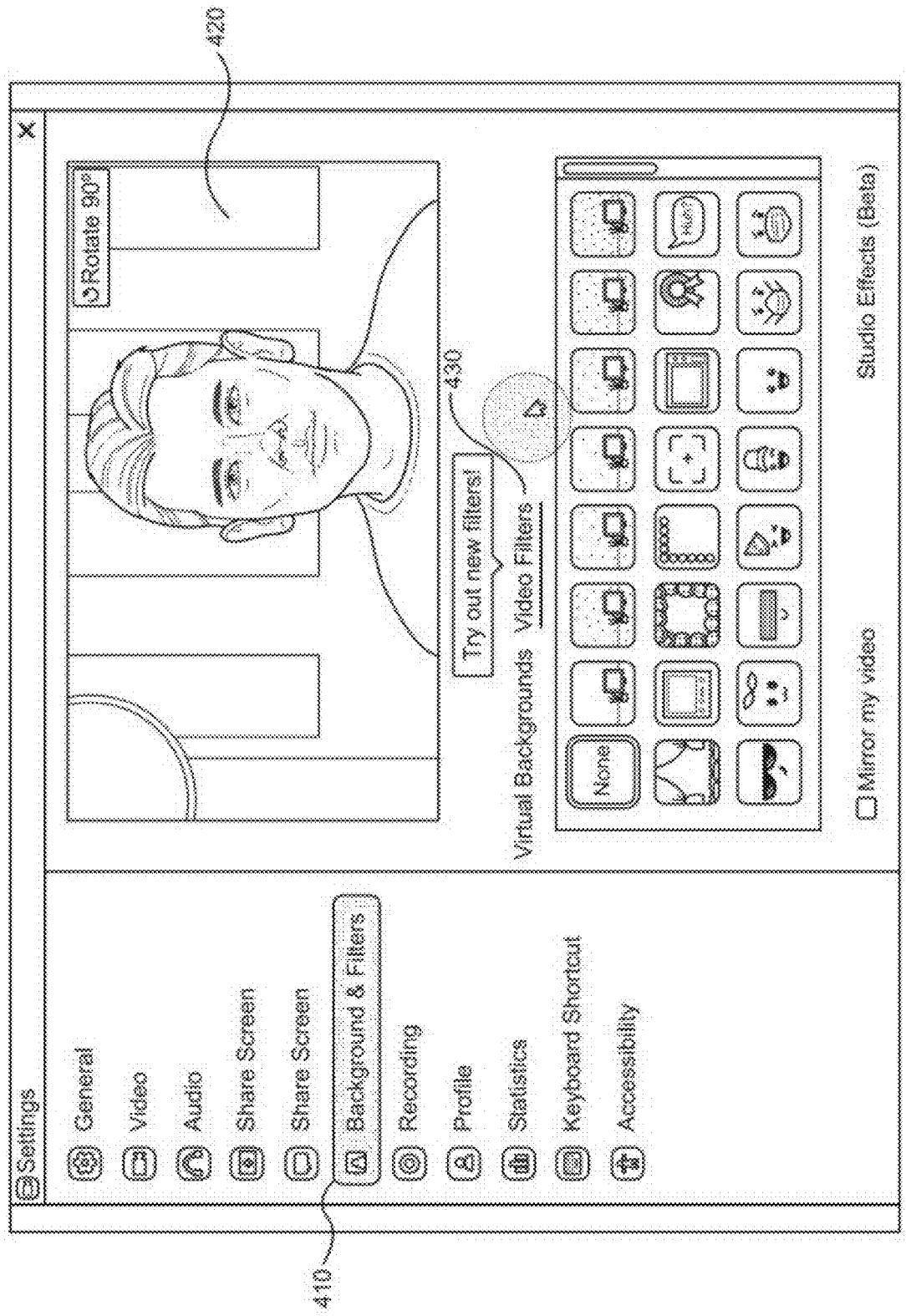
FIG. 4A is a diagram illustrating one example embodiment of a UI within a video communication session, including a video filters section, according to some embodiments.

One example of such a settings UI section is illustrated in FIG. 4A. The sidebar illustrated includes such selectable UI elements as: General, Video, Audio, Share Screen, Chat, Background & Filters, Recording, and more. The "Background & Filters" UI element in this example is an example of a video effects UI element.

In some embodiments, another portion of the UI displays a number of participant windows. The participant windows correspond to the multiple participants in the video communication session. Each participant is connected to the video communication session via a client device. In some embodiments, the participant window may include video, such as, e.g., video of the participant or some representation of the participant, a room the participant is in or virtual background, and/or some other visuals the participant may wish to share (e.g., a document, image, animation, or other visuals). In some embodiments, the participant's name (e.g., real name or chosen username) may appear in the participant window as well. One or more participant windows may be hidden within the UI, and selectable to be displayed at the user's discretion. Various configurations of the participant windows may be selectable by the user (e.g., a square grid of participant windows, a line of participant windows, or a single participant window). The participant windows are also configured to display any video effects applied from the participant in question. Some participant windows may not contain any video, for example, if a participant has disabled video or does not have a connected video camera device (e.g. a built-in camera within a computer or smartphone, or an external camera device connected to a computer).

The videos displayed for at least a subset of the participants appear within each participant's corresponding participant window. Video may be, e.g., a live feed which is streamed from the participant's client device to the video communication session. In some embodiments, the system receives video content depicting imagery of the participant, with the video content having multiple video frames. The system provides functionality for a participant to capture and display video imagery to other participants. For example, the system may receive a video stream from a built-in camera of a laptop computer, with the video stream depicting imagery of the participant.

Returning to FIG. 2, at step 220, the system receives a selection by a participant of the video effects UI element. As described above with respect to FIG. 4A, the "Background & Filters" UI element is a video effects UI element. Upon a participant of the video communication session clicking on this UI element or otherwise selecting the element, the system receives the selection.

At step 230, the system displays a number of video effects options for modifying the appearance of the video corresponding to the participant and/or modifying a visual representation of the participant within the video. Returning to FIG. 4A, upon the user selecting the "Background & Filters" UI element, the user is directed to a new UI window with a "Video Filters" UI element 430. A variety of selectable video effects options are displayed.

In some embodiments, one or more of these video effect options includes inserting a frame and/or border around the perimeter of the video corresponding to the participant. Examples of this frame or border within a video image are illustrated within FIG. 4B and FIG. 4D, which will be described in further detail below. For example, one option may include adding a border of small circles around the perimeter of the video, as in FIG. 4B. Another option may include adding a border of emoji faces around the perimeter of the screen, as in FIG. 4D.

In some embodiments, one or more of the video effect options includes adding one or more accessories or features to the visual representation of the participant within the video. Accessories may include objects which the participant may be depicted as wearing, such as hats or glasses. An example of a hat accessory is illustrated within FIG. 4E, which will be described in further detail below. Features may include facial features, such as virtual eyebrows, lip color or lipstick, makeup, facial hear (e.g., a beard or moustache), tattoos, wrinkles, scars, or any other suitable facial features. In some embodiments, features may include alterations to the participant's existing visual features, such as a different eye color, a different hair color, replaced hair or virtual wig, a different size or style of nose or ears, or any other suitable alteration.

In some embodiments, one or more of the video effect options includes adding one or more hue or color filters to the video corresponding to the participant. For example, a participant may wish to change the color of the video to blue to give the video a different effect, style, or mood. A participant may instead wish to change the hue of the video to grayscale, sepia, or a different style.

In some embodiments, one or more of the selectable video effects options may be provided by a participant within the video session or a third party. In some embodiments, selectable video effects options are extensible, and may be submitted or uploaded by users of the video platform. For example, the platform may be configured to allow different video effects providers to add their own hats, glasses, virtual wigs or hairstyles, or other video effects. These effects can be chosen by a participant and then incorporated into the set of available video effects for that participant during the video communication session. In some embodiments, users may be able to upload their own video effects using an upload UI section. In some embodiments, a user may be able to simply upload his or hew own image of choice to the remote server, and that image can then become a usable video effect option, such as an accessory. This allows the process to be streamlined, easy, and accessible for most users, with minimal requirements.

In some embodiments, users may be able to purchase premium video effects or download free video effects from a separate online store interface. Such added video effects would then appear within the video effects options, beyond the base or default set of video effects.

In some embodiments, new content may be added to the available video filter effects options, whether as first party, third party, or participant-submitted options. For example, a new frame, sticker, or accessory may be created for use within videos. In some embodiments, new categories of content may be added as well, such as, for example, new accessories to be worn on shoulders, earring accessories, and eyelashes. In some embodiments, there may be more styles added onto existing categories. For example, new styles of hats or glasses may be created. Sets or collections of content may also be provided in some embodiments. For example, a user may download a "sticker pack" featuring a variety of different stickers which can be "placed" virtually on the video feed. In some embodiments, the video communication platform provides one or more Application Programming Interfaces ("APIs") to facilitate this extensibility of content and to provide rich, flexible ways of producing new content for users of the platform.

In some embodiments, third party companies, such as fashion or retail brands, may partner with the video communications platform to present new offerings of video effects options for participants. This may be a way of exposing potential customers to the brand, and it may also lead to users of the platform getting some benefit out of brands offering new content to be used within videos. In some embodiments, a revenue sharing arrangement may be in place between a third party companies and the video communications platform, such that a portion of revenue from sales of premium video effects may automatically accrue to third party partners.

Returning to FIG. 2, at step 240, the system receives a selection by the participant of a video effects option from the number of video effects options. The participant may select the video effects option via a client device associated with the participant. The client device in question may be, e.g., the first user's client device 150, where the first user is a participant of the video session who selected the video effects option from the video effects UI element. In some embodiments, the video effects UI element may be selected by a participant by, e.g., clicking or holding down a mouse button or other component of an input device, tapping or holding down on the UI element with a finger, stylus, or pen, hovering over the UI element with a mouse or other input device, or any other suitable form of selecting a UI element. Upon selecting the desired video effects option, the selection is sent to the system (e.g., the processing engine 102) to be processed.

In some embodiments, upon selecting a video effects option, the video effect is immediately displayed within a preview window showing what the video looks like. In some embodiments, the video effect is added to the user's appearance in real time as it streams to other participants of the video session. In other embodiments, the video effect can be previewed by the participant, but is not viewable to other participants until the participant finalizes his or her selection with a "Close", "Save", or similar UI element.

At step 250, the system receives a subselection for customizing at least the amount of the video effect to be applied. In some embodiments, the amount of the effect to be applied is a depth of effect and/or an opacity amount for the video effect to be applied in real time or substantially real time. In some embodiments, this may take the form of an opacity slider UI element, or similar UI element. This slider allows the user to slide across a spectrum of values to dial in a precise value, where the lowest value equates to no effect depth or zero opacity for the video effect—i.e., the video effect is not visible within the video at all—and where the highest value equates to full effect depth or 100% full opacity for the video effect—i.e., the video effect is visible and presented at full intensity within the video. An example of subselection UI elements and opacity sliders is illustrated within FIG. 4H, which will be described in further detail below At step 260, the system applies, in real time or substantially real time, the selected video effect in the selected amount to the video corresponding to the participant. In some embodiments, the system applies the video effect in real time immediately upon selection, and applies the subselection of opacity of the video effect in real time as the user slides the opacity slider. In other embodiments, the video effect only goes into effect within the video upon the user finalizing and closing the video effects options UI element. At that point, all changes are applied in real time or substantially real time and streamed to viewers, with the appropriate depth of effect or opacity.

In some embodiments, the video effects are applied via partial or full use of "image masking" techniques, backdrop removal techniques, or other image processing and editing techniques. In some embodiments, an image mask may be generated by determining a boundary about the visual representation of the participant within the participant's video, with the boundary containing an interior portion and an exterior portion. In some embodiments, the interior portion and exterior portion of the boundary each constitute layers which are separated into different images for each video frame. In various embodiments, image masking techniques used may include, e.g., layer masking, clipping masking, alpha channel masking, or any other suitable image masking techniques. In some embodiments, the boundary is updated each time the user moves, i.e., as additional video frames are received, such that the user moving around in the frame of the video leads to the boundary being updated.

Thus, for example, applying a hat as an accessory video effect to a participant's head would involve placing the hat within the same layer as the interior portion of the boundary around the participant. The hat is attached to a specific position within the layer, so that whenever the user's head moves around in the video, the hat moves around in sync. The system attempts to recognize where the participant's head is, in real time or substantially real time, such that the hat can reattach itself to the participant's head from the positioning point of view. Other possibilities and approaches may be contemplated depending on the video effect.

As another example, a color filter which applies a certain color to the entire video may be placed in a layer above the image mask. As such, the filter can be applied uniformly to the video. A virtual background, in contrast, may be placed in a layer below the image mask.

In some embodiments, the system detects at least one hand of the participant in front of the applied video effect, and then adjusts, in real time or substantially real time, the selected video effect such that the hand appears over the video effect. For example, a video may present a participant wearing a hat on a user's head. The hat appears in a layer which is more to the front than the layer depicting the participant, making the hat appear to cover up the participant's hair. The illusion of the hat on the participant's head would break, however, if the participant puts his hand on his head and it appears to slide beneath the hat, since the hand is in a layer more backwards than the hat. To correct this, the system can detect the present of a hand in front of the applied video effect, and very quickly and responsively adjust the hand, in real time or substantially real time, such that it appears over the hat rather than under it. This maintains the illusion that the hat is still on the participant's head. In various embodiments, this detection and adjustment can occur for any object that is capable of being detected by the system as it passes over any video effect that is placed within a certain layer.

In some embodiments, the video effect is visible to all participants whose UI is currently showing the video or participant window of the participant who selected the video effect. In some embodiments, the video effect is visible within the video to all participants regardless of whether the appropriate participant window is visible on the UI.

In some embodiments, an administrator, host, or settings coordinator for the video communication session may have disabled video effects from being displayed for some or all participants. In some embodiments, this may lead to the video effect not being displayed on a video despite a participant selecting the video effect. In other embodiments, the participants will not be able to select the video effects options UI element at all, as it is greyed out or otherwise disabled. In some embodiments, participants themselves may have the option to disable video effects within their own UI. This may be useful for participants who find the video effects to be distracting, for example. In some embodiments, individual video effects options may be singularly greyed out or disabled, such that a participant is not able to select it, if an administrator, host, or settings coordinator configures the video session to have that video effect option disabled.

Alternatively, in some embodiments, the system may determine that video effects are permitted to be displayed within the video communication session. In some embodiments, the system may determine, based on one or more settings, that the applied video effect is to be applied to one or more future video communication sessions in addition to the current video communication session. A participant can select the applied video effect to be applied to all future video communication sessions, or to be applied to all future recurring video communication sessions in a recurring series of video communication session. In some embodiments, the system may integrate these settings with an external calendar application in order to reflect the settings are to be applied within a calendar invite or other calendar data.

In some embodiments, the system may determine, based on device settings for a participant's specific client device displaying the UI, that one or more video effects options are to be disabled within the video communication sessions. The system then removes the one or more video effects options from the variety of video effects options within the participant's UI, but not within other participant's UIs (unless their device settings have disabled the video effects option as well).

In some embodiments, the video effect is applied within an augmented reality (AR) or virtual reality (VR) environment. A video communication session may take place within an AR or VR space, and video effects may be applied to videos to appear within that space realistically. In some embodiments, this requires generating a modeled object to appear in the space without looking out of place. Three-dimensional object modeling and other processes may be applied in order to facilitate the generation of a video effect within a streamed VR or AR space.

In some embodiments, the system receives one or more additional selections by the participant of one or more additional video effects from the plurality of video effect, then receives one or more subselections for customizing at least the amount of the one or more additional video effects to be applied. The system then applies, in real time or substantially real time, the one or more selected additional video effects in the selected amount to the video corresponding to the participant such that the additional video effects are presented concurrently to the selected video effect. As such, multiple video effects can be combined within any one single video. In some embodiments, a number of applied video effects can be displayed within a video communication session across a number of videos corresponding to participants, in various degrees of opacity. Thus, multiple participants can be streaming videos with a variety of video effects applied to varying degrees, and all of the video effects across these videos are displayed simultaneously. In some embodiments, this simultaneous rendering and displaying of video effects may be applied for even a large group meeting with many participants.

FIG. 3 is a flow chart illustrating an exemplary embodiment of video effects options within a video communication session, according to some embodiments. First party default video effects 310 may include a default, base set of frames, borders, accessories, appearance adjustments, features, virtual backgrounds, filters, or any other suitable video effects which may be included by default within the video communications platform for all users. First party add-on video effects 320 may include official, special premium or free video effects options which can be added onto the existing base set of video effects. Participant-contributed video effects 330 include any video effects which a participant may have uploaded themselves for a customized effect visible to all participants of the video session. Third party-generated video effects 340 include any effects which third party developers may have created for users to add to their video filter effect options beyond first party official video effects. Video effects disabled by administrator 350 may appear as greyed out or disabled, and are disabled if an administrator, host, or manager of a corporate account chooses to disable them. Video effects disabled based on device settings 360 may appear as greyed out or disabled due to a participant's client device being unable to properly render them without a compromised level of playback performance or video quality.

FIGS. 4A-4I are diagrams illustrating a video effects options UI through different example embodiments.

FIG. 4A is a diagram illustrating one example embodiment of a UI within a video communication session, including a video filters section, according to some embodiments. Within a settings UI window, a sidebar is displayed with a variety of settings. One such setting is the "Background & Filters" section, which functions as a video effects options UI element 410. Upon the participant selecting this section, a video effects options section is displayed within the window, including a preview window 420 depicting a live video of the participant, as well as a video effects options section 430 below the video preview window 420. "Virtual Backgrounds" and "Video Filters" tabs are shown. Upon selecting the "Video Filters" tab, the user is presented with a variety of video effects options.

Some of the video effects options illustrated include: in the top row, no effect, a light grayscale hue filter, a dark grayscale hue filter, a sepia tone hue filter, and other hue or color filters; in the middle row, a video theater effect, a retro television effect, a border of emoji faces, a border of small circles, a camera view effect, a monochrome television effect, an awards medal effect, and a comic bubble effect; and in the bottom row, accessories including, e.g., sunglasses, a rainbow visor, a party hat, a baseball hat, a halo, and different facemasks. Other options are viewable and selectable upon the user scrolling down with the scrollbar UI element on the right.

Below the available video effects options, an option is featured to "Mirror my video". This creates a mirror image of the video feed which is displayed to other participants and displayed within the preview video.

Figure 4B:
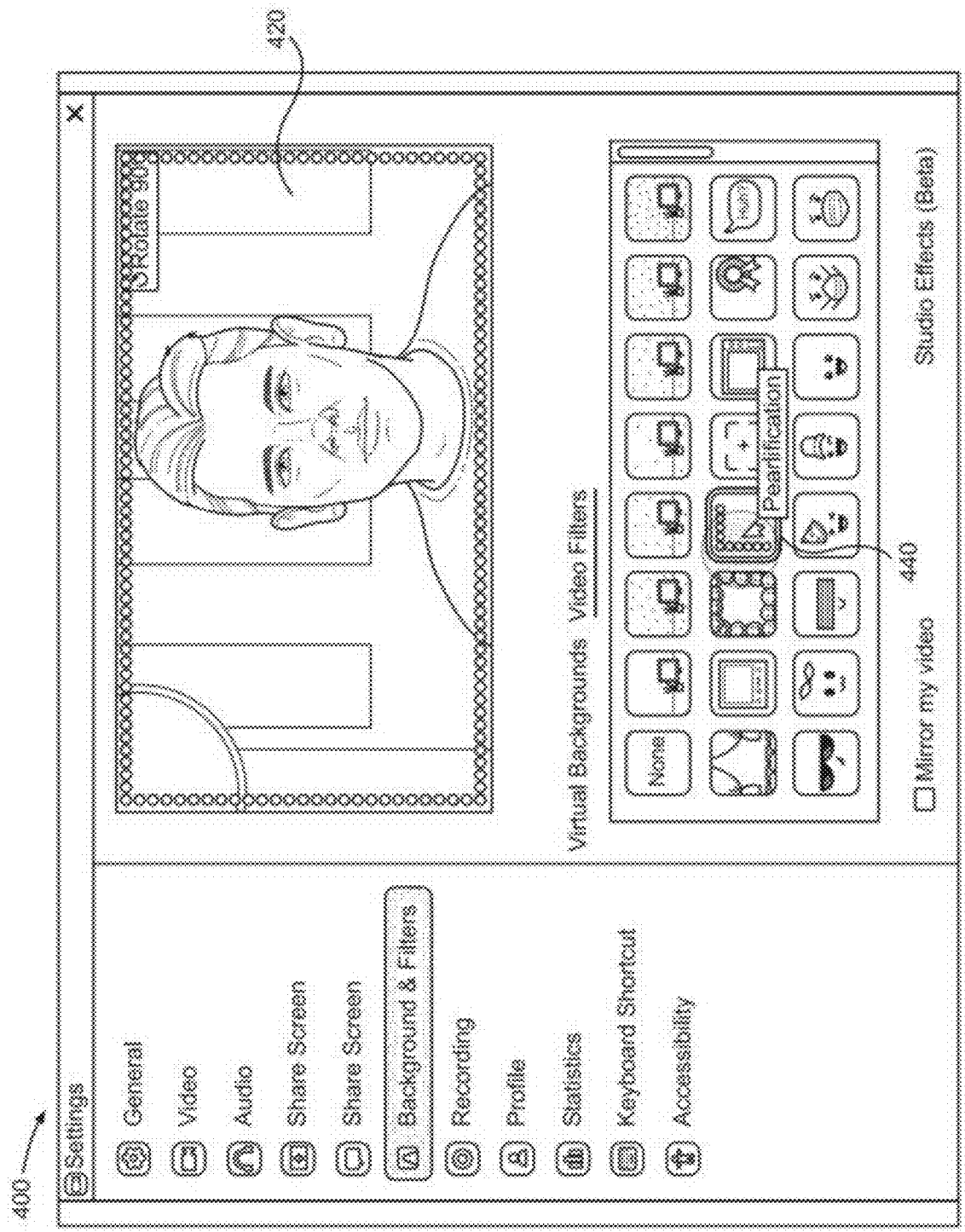
FIG. 4B is a diagram illustrating one example embodiment of a variety of selectable video effects within a video communication session, according to some embodiments.

FIG. 4B is a diagram illustrating one example embodiment of a variety of selectable video effects within a video communication session, according to some embodiments. The participant has selected a border video effect option 440 from the available video effects options. The border, which is a border of small circles, appears within the participant's preview video in real time or substantially real time. In some embodiments, upon selecting the effect, other participants see the effect on the stream immediately, while in other embodiments, the effect is visible only after the participant finalizes and closes the settings UI element.

Figure 4C:
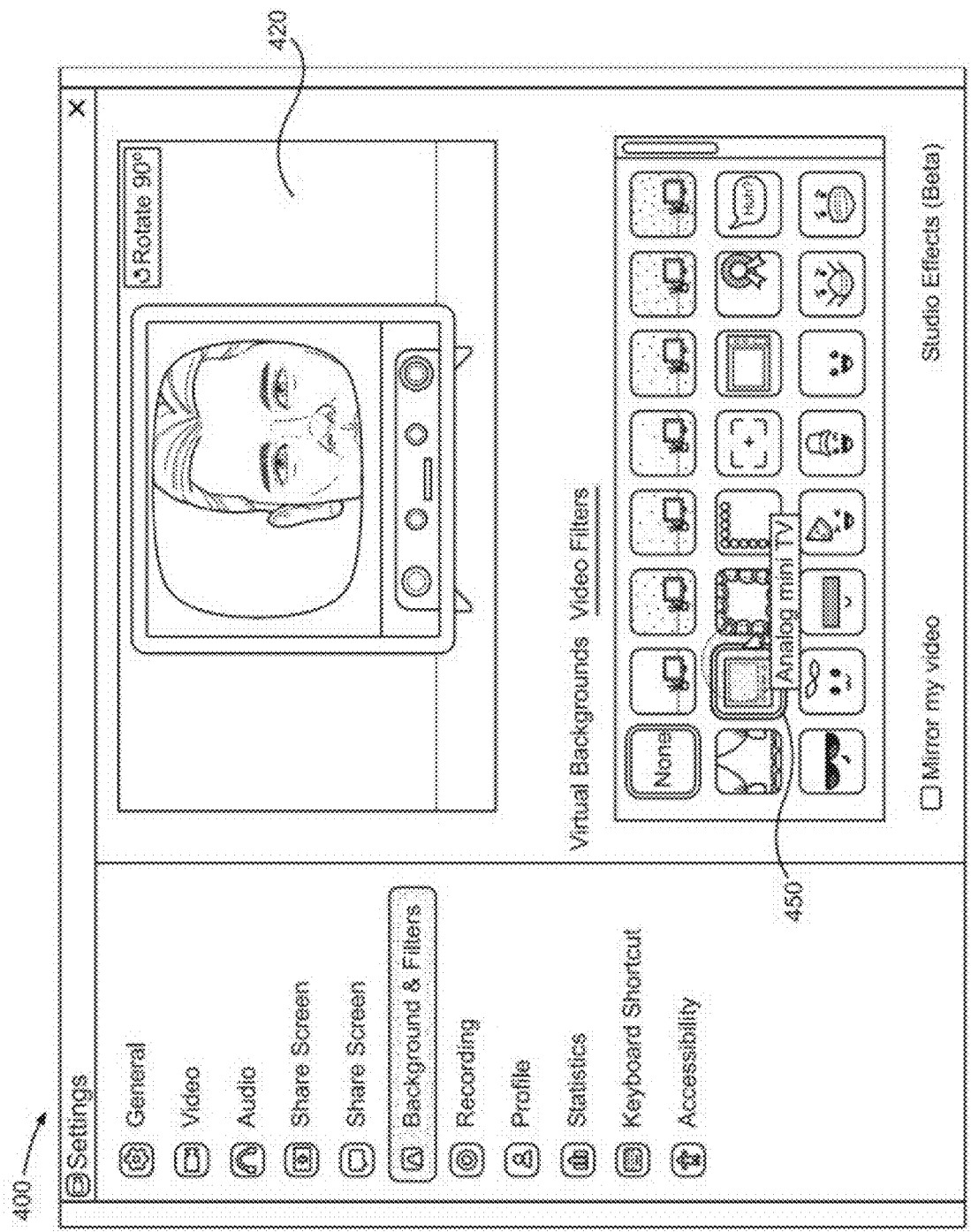
FIG. 4C is a diagram illustrating one example embodiment of a video effect option within a video communication session, according to some embodiments.

FIG. 4C is a diagram illustrating one example embodiment of a video effect option within a video communication session, according to some embodiments. The participant has selected a retro television video effect option 450 from the available video effects options. The effect places the participant's image inside of a vintage television set.

Figure 4D:
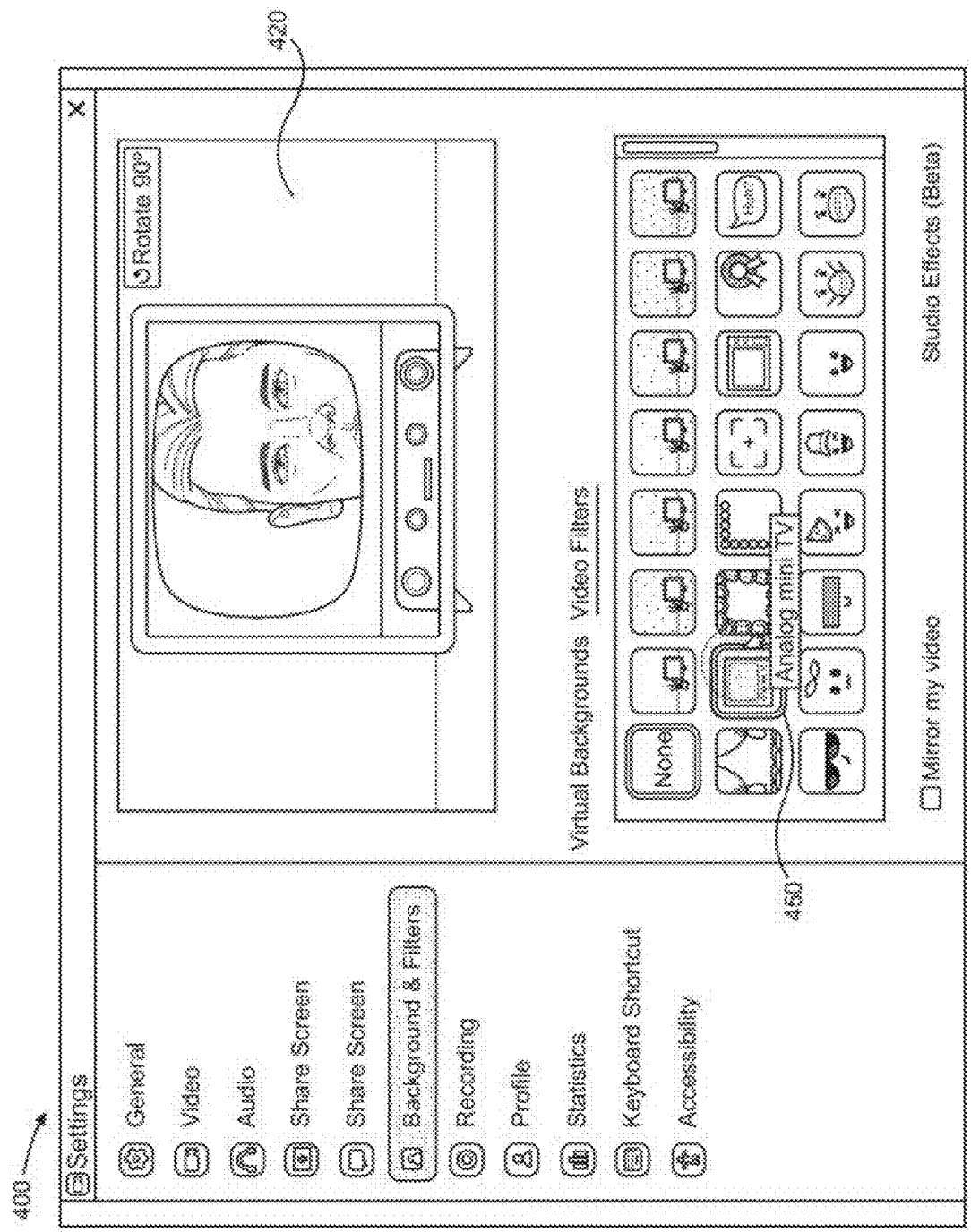
FIG. 4D is a diagram illustrating one example embodiment of a video effect option within a video communication session, according to some embodiments.

FIG. 4D is a diagram illustrating one example embodiment of a video effect option within a video communication session, according to some embodiments. The participant has selected a border video effect option 460 from the available video effects options. The effect places a border of laughing or smiling emoji faces around the perimeter of the video.

Figure 4E:
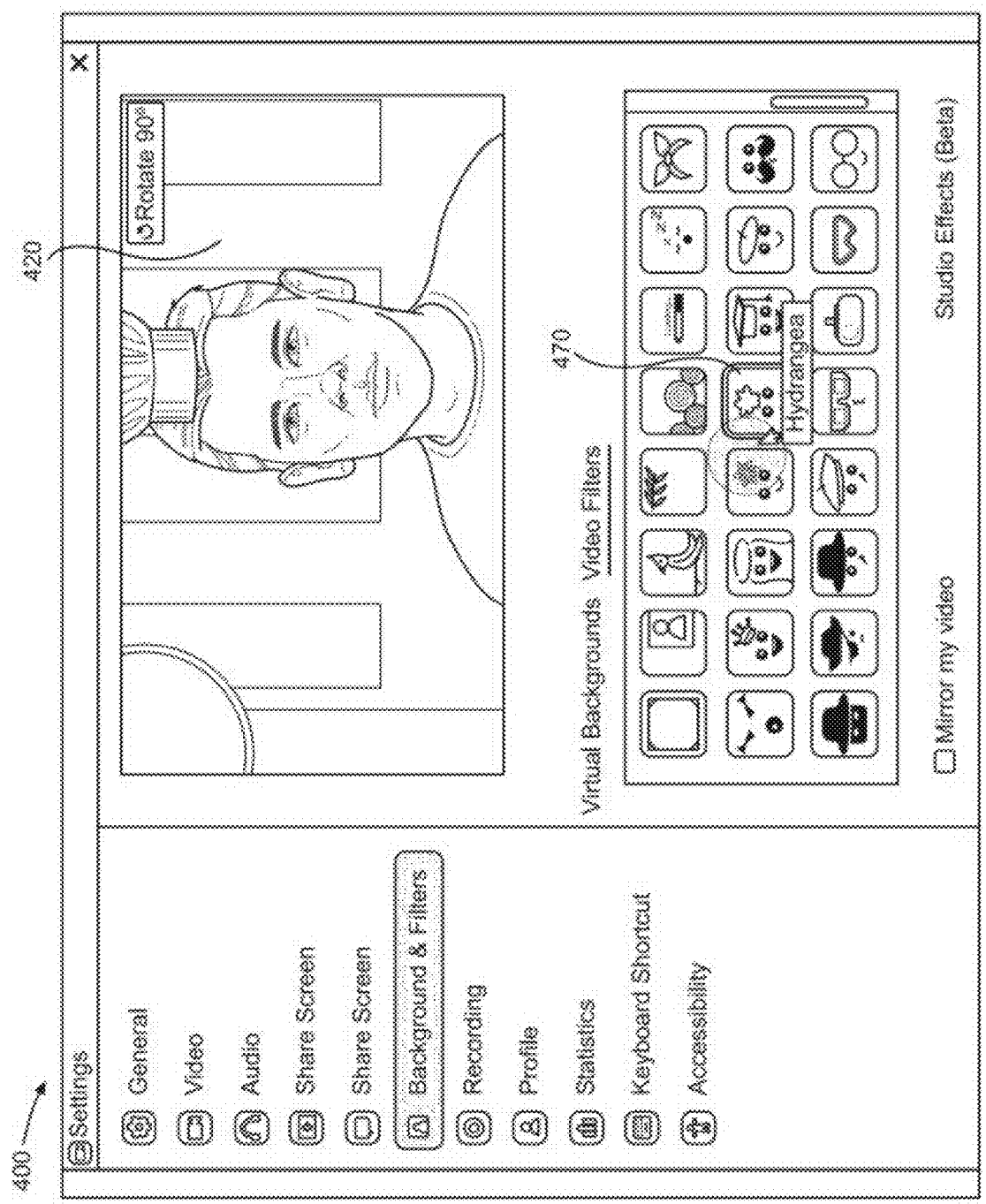
FIG. 4E is a diagram illustrating one example embodiment of an accessory video effect option within a video communication session, according to some embodiments.

FIG. 4E is a diagram illustrating one example embodiment of an accessory video effect option within a video communication session, according to some embodiments. The participant has selected an accessory video effect option 470 from the available video effects options. The accessory effect places a virtual chef's hat on top of the participant's head. As the participant moves his head, the system configures the virtual hat to move accordingly in real time along with the movement of the head.

Figure 4F:
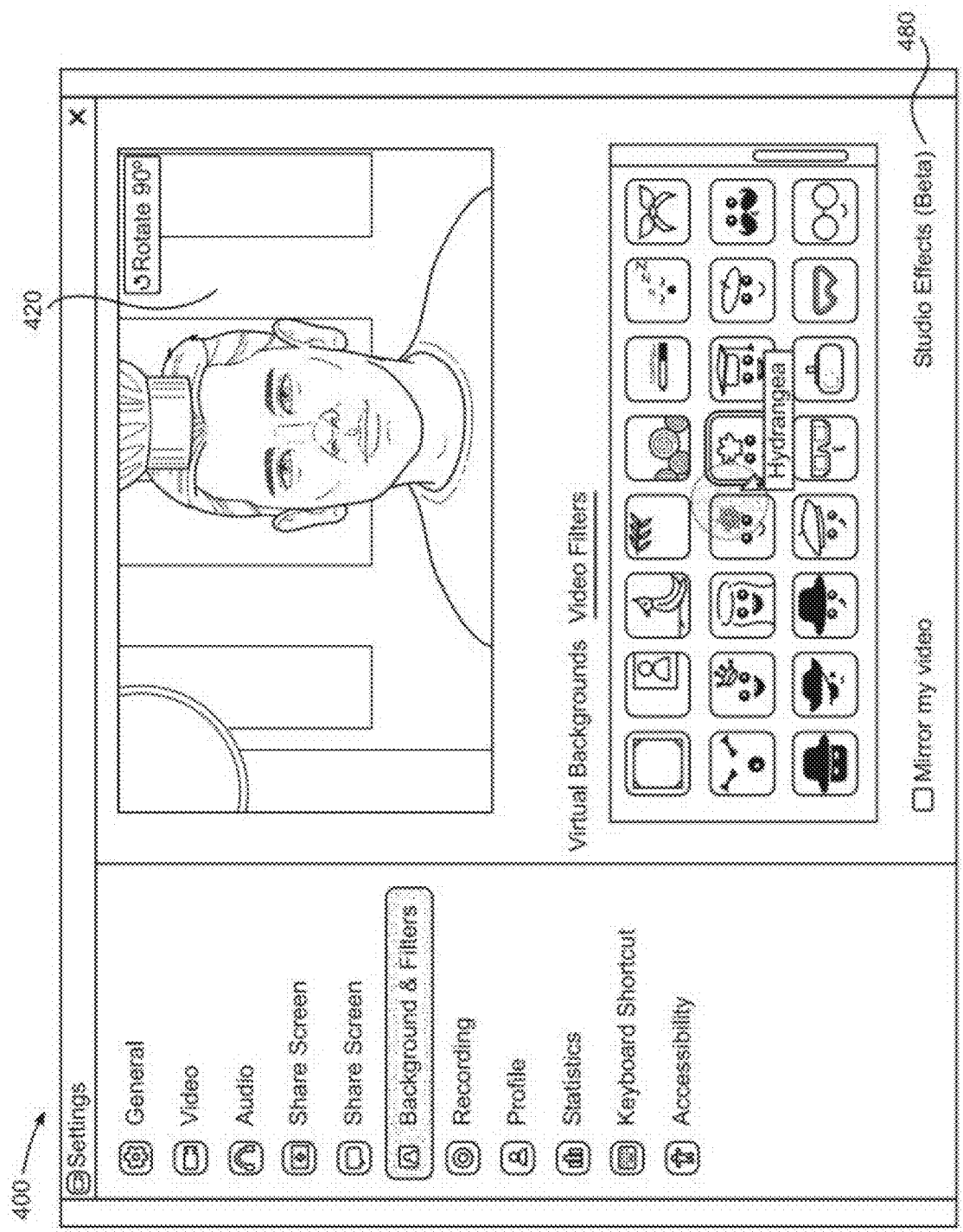
FIG. 4F is a diagram illustrating one example embodiment of a studio effects UI element within a video communication session, according to some embodiments.

FIG. 4F is a diagram illustrating one example embodiment of a studio effects UI element within a video communication session, according to some embodiments. The participant is about to select a "Studio Effects" UI element 480 to bring up available video effects options in the studio effects category.

Figure 4G:
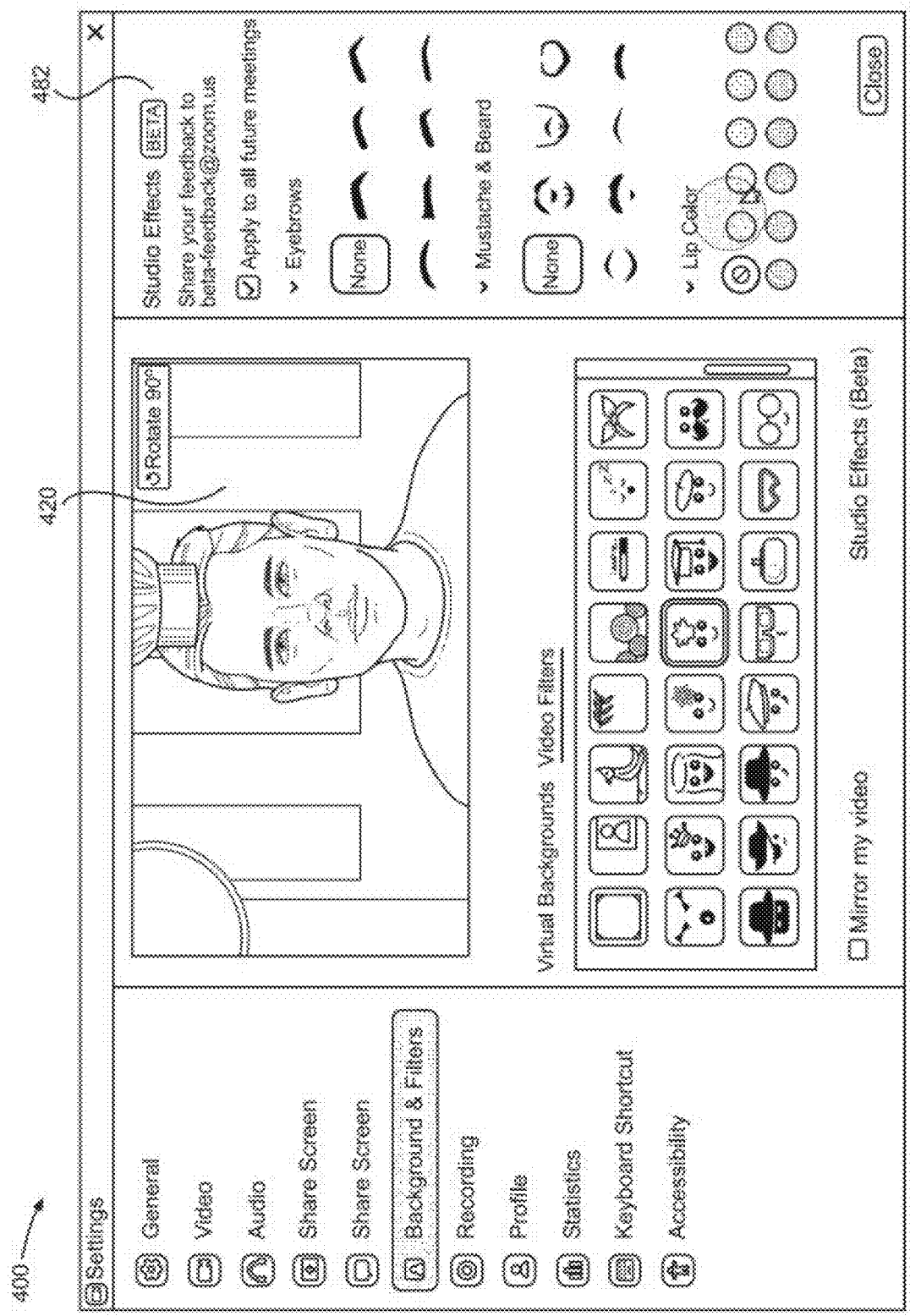
FIG. 4G is a diagram illustrating one example embodiment of a variety of studio effects within a video communication session, according to some embodiments.

FIG. 4G is a diagram illustrating one example embodiment of a variety of studio effects within a video communication session, according to some embodiments. Upon selecting the studio effects UI element, the system displays a "Studio Effects" section 482. The section contains several additional selectable UI elements for video effects options. A variety of different styles of eyebrows are selectable, as well as a variety of different facial hair, including moustaches and beards. A variety of lip colors may be selected from as well, or the user may select the color wheel on the lower right to select a custom lip color from the available spectrum of colors.

A checkbox UI element at the top of the studio effects section reads "Apply to all future meetings" and is checked. Upon a user checking this checkbox element, the studio effects chosen will persist across all future meetings until the box is unchecked within the participant's settings. This feature provides a useful way to establish a particular look and maintain it across multiple meetings. For example, a user may like the way some subtle facial hair may be applied to his or her face, and may choose to have it appear for all future meetings.

Figure 4H:
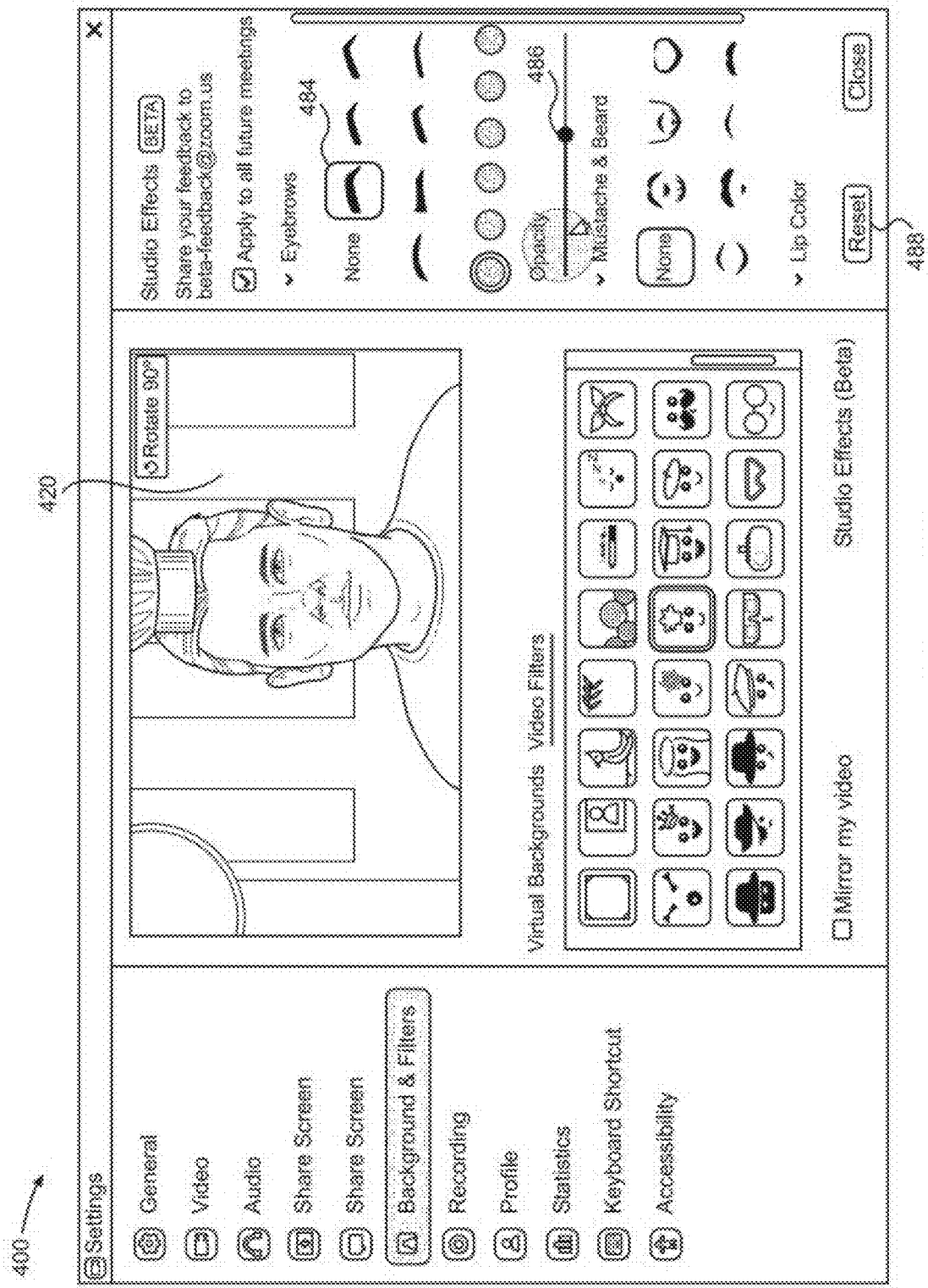
FIG. 4H is a diagram illustrating one example embodiment of an opacity slider within a video communication session, according to some embodiments.

FIG. 4H is a diagram illustrating one example embodiment of an opacity slider within a video communication session, according to some embodiments. The participant has selected a particular style of eyebrow 484, which appears automatically within the participant's preview window. A black color has been selected for the eyebrows. Below the color options, an opacity slider 486 appears, which is a subselection that a participant can select in order to select the amount of the effect to be displayed within the video. The participant has currently set the opacity slider to be positioned approximately ⅗ of the distance to the rightmost setting, i.e., the setting with the video effect fully applied. As such, the eyebrows will appear ⅗ths opaque on the video screen. As the participant drags the slider UI element left or right to different values, the video effects increases or decreases in opacity in real time or substantially real time. At the bottom of the studio effects section, a "Reset" UI element appears. If a participant selects this option, all studio settings will be reset to either the previous settings from before the participant made selections or subselections, or the original default settings (which may amount to no studio effects applied).

Figure 4I:
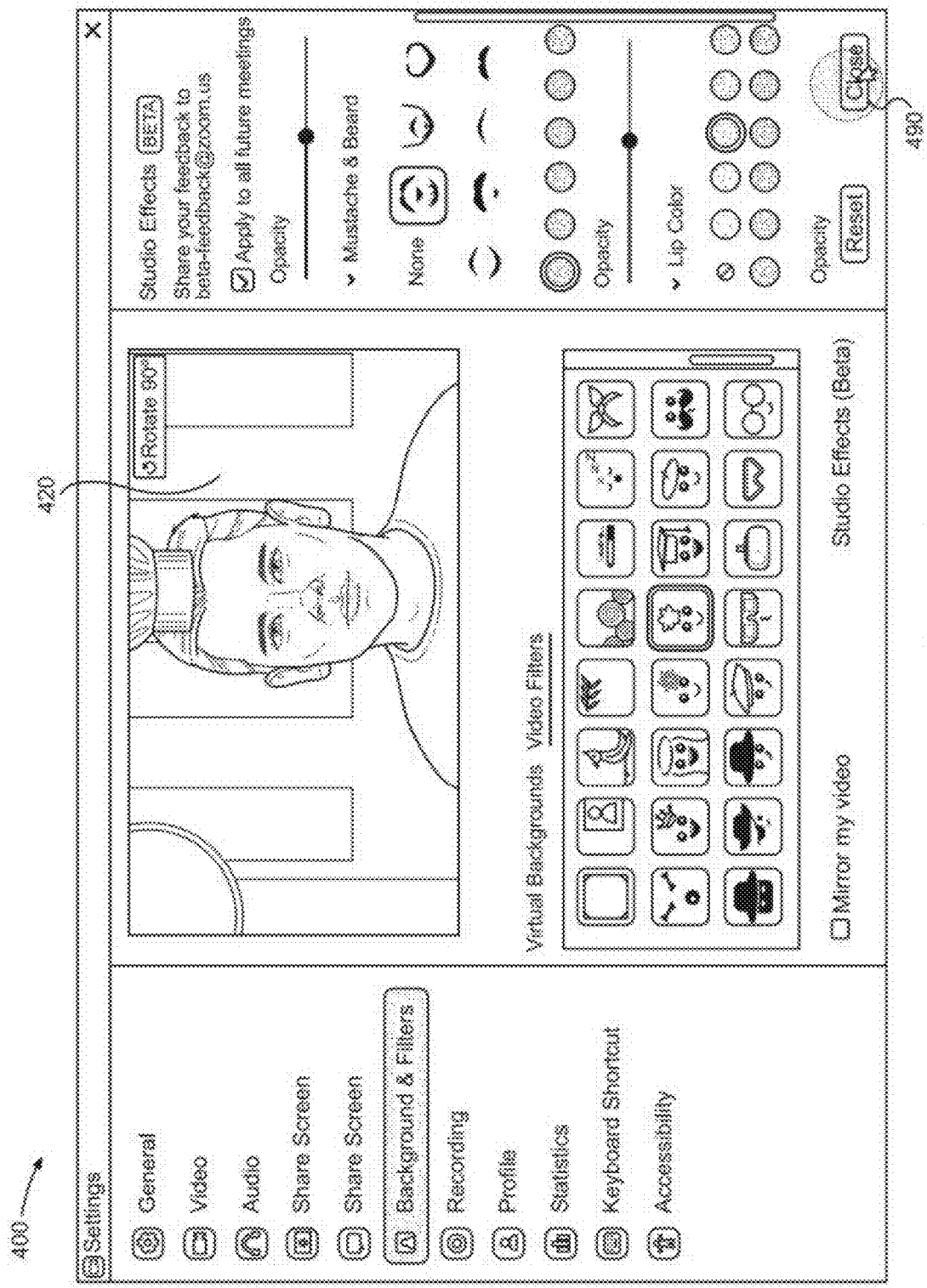
FIG. 4I is a diagram illustrating one example embodiment of closing a studio effects section within a video communication session, according to some embodiments.

FIG. 4I is a diagram illustrating one example embodiment of closing a studio effects section within a video communication session, according to some embodiments. The participant is to select a "Close" UI element 490 which appears at the bottom right of the studio effects section. In some embodiments, upon the participant selected the "Close" UI element 490, all video effects which have been applied to the participant's preview window, and all subselections of amounts of effects to be applied, will be reflected in the participant's video that is streamed to other participants of the video communication session. In other embodiments, such changes have already been applied in real time, and thus closing merely closes the settings UI section. The system then navigates the user back to the video communications session or other UI section the participant was navigating prior to the settings UI section.

FIG. 5 is a diagram illustrating an exemplary computer that may perform processing in some embodiments. Exemplary computer 500 may perform operations consistent with some embodiments. The architecture of computer 500 is exemplary. Computers can be implemented in a variety of other ways. A wide variety of computers can be used in accordance with the embodiments herein.

Processor 501 may perform computing functions such as running computer programs. The volatile memory 502 may provide temporary storage of data for the processor 501. RAM is one kind of volatile memory. Volatile memory typically requires power to maintain its stored information. Storage 503 provides computer storage for data, instructions, and/or arbitrary information. Non-volatile memory, which can preserve data even when not powered and including disks and flash memory, is an example of storage. Storage 503 may be organized as a file system, database, or in other ways. Data, instructions, and information may be loaded from storage 503 into volatile memory 502 for processing by the processor 501.

The computer 500 may include peripherals 505. Peripherals 505 may include input peripherals such as a keyboard, mouse, trackball, video camera, microphone, and other input devices. Peripherals 505 may also include output devices such as a display. Peripherals 505 may include removable media devices such as CD-R and DVD-R recorders/players. Communications device 506 may connect the computer 100 to an external medium. For example, communications device 506 may take the form of a network adapter that provides communications to a network. A computer 500 may also include a variety of other devices 504. The various components of the computer 500 may be connected by a connection medium such as a bus, crossbar, or network.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A communication system comprising one or more processors configured to perform operations of:
    displaying, for a plurality of participants within a video communication session, a video for each of at least a subset of the participants and a user interface (UI), the UI comprising a video effects UI element;
    receiving an image from a participant;
    converting the image to be one of a plurality of video effects options;
    receiving a selection by the participant of the video effects UI element;
    in response to receiving the selection, displaying the plurality of video effects options for modifying an appearance of the video corresponding to the participant and/or modifying a visual representation of the participant within the video;
    receiving a first selection by the participant of a first video effect from the plurality of video effects options for a first video provided to a first participant;
    receiving a subselection for customizing at least an amount of the first video effect to be applied to the first video, the amount of the first video effect comprising: an intensity of effect for the first video effect to be applied, and an opacity amount for the first video effect to be applied, wherein the intensity of effect for the first video effect to be applied defines an amount of modification made to a visual representation of a participant;

receiving a second selection by the participant of a second video effect from the plurality of video effects options for a second video provided to a second participant;

applying, in real time or substantially real time, the first video effect in the selected amount to the first video; and applying, in real time or substantially real time, the second video effect to the second video.

2. The system of claim 1, wherein one or more of the plurality of video effects options further comprises inserting a frame and/or border around a perimeter of the video corresponding to the participant.

3. The system of claim 1, wherein one or more of the plurality of video effects options comprises adding one or more accessories or features to the visual representation of the participant within the video.

4. The system of claim 1, further configured to perform the operations of:
detecting at least one hand of the participant in front of each applied video effect; and
adjust, in real time or substantially real time, each applied video effect such that the hand appears over each applied video effect.

5. The system of claim 1, wherein the participant can select each applied video effects to be applied to all future video communication sessions or to be applied to all future recurring video communication sessions in a recurring series of video communication sessions.

6. The system of claim 1, further configured to perform the operations of:
receiving one or more additional selections by the participant of one or more additional video effects from the plurality of video effects options;
receiving one or more subselections for customizing at least the amount of the one or more additional video effects to be applied; and
applying, in real time or substantially real time, the one or more selected additional video effects in the selected amount to the video corresponding to the participant such that the additional video effects are presented concurrently to the first video effect.

7. The system of claim 1, wherein the plurality of video effects options comprises one or more added video effects options beyond a base or default set of video effects.

8. The system of claim 7, wherein at least a subset of the one or more added video effects options have been generated by a third party.

9. The system of claim 7, wherein at least a subset of the one or more added video effects options have been submitted by the participant.

10. The system of claim 1, wherein one or more of the plurality of video effects options comprises applying a color or hue filter to the video corresponding to the participant.

11. The system of claim 1, wherein a plurality of applied video effects can be displayed within a video communication session across a plurality of videos corresponding to participants.

12. The system of claim 1, further configured to perform the operation of:
determining, based on settings for the video communication session, that video effects are permitted to be displayed within the video communication session.

13. The system of claim 1, further configured to perform the operations of:
determining, based on settings for the video communication session, that one or more video effects options are to be disabled within the video communication session; and
removing the one or more video effects options from the plurality of video effects options.

14. The system of claim 1, further configured to perform the operations of:
determining, based on device settings for a participant's client device displaying the UI, that one or more video effects options are to be disabled within the video communication sessions; and
removing the one or more video effects options from the plurality of video effects options within the participant's UI but not other participants' UIs.

15. The system of claim 1, wherein the plurality of video effects options includes an option to mirror the image from the participant, wherein each video effect that includes a color filter applies the color filter to the entire video, and wherein the system is further configured to perform the operations of:
determining whether video effects are permitted for a particular video communication session before any video effects are applied.

16. A method of applying a video effect to a video corresponding to a participant within a video communication session, comprising:
displaying, for a plurality of participants within a video communication session, a video for each of at least a subset of the participants and a user interface (UI), the UI comprising a video effects UI element;
receiving an image from a participant;
converting the image to be one of a plurality of video effects options;
receiving a selection by the participant of the video effects UI element;
in response to receiving the selection, displaying the plurality of video effects options for modifying an appearance of the video corresponding to the participant and/or modifying a visual representation of the participant within the video;
receiving a first selection by the participant of a first video effect from the plurality of video effects options for a first video provided to a first participant;
receiving a subselection for customizing at least an amount of the first video effect to be applied to the first video, the amount of the first video effect comprising: an intensity of effect for the first video effect to be applied, and an opacity amount for the first video effect to be applied, wherein the intensity of effect for the first video effect to be applied defines an amount of modification made to a visual representation of a participant;
receiving a second selection by the participant of a second video effect from the plurality of video effects options for a second video provided to a second participant;
applying, in real time or substantially real time, the first video effect in the selected amount to the first video corresponding to the participant; and
applying, in real time or substantially real time, the second video effect to the second video.

17. The method of claim 16, further comprising:
receiving one or more additional selections by the participant of one or more additional video effects from the plurality of video effects options;
receiving one or more subselections for customizing at least the amount of the one or more additional video effects to be applied; and applying, in real time or substantially real time, the one or more selected additional video effects in the selected amount to the first video corresponding to the participant such that the additional video effects are presented concurrently to the first video effect.

18. The method of claim 16, wherein the plurality of video effects options comprises one or more added video effects options beyond a base or default set of video effects.

19. The method of claim 18, wherein at least a subset of the one or more added video effects options have been submitted by the participant.

20. A non-transitory computer-readable medium containing instructions for applying a video effect to a video corresponding to a participant within a video communication session, comprising:
- instructions for displaying, for a plurality of participants within a video communication session, a video for each of at least a subset of the participants and a user interface (UI), the UI comprising a video effects UI element;
- instructions for receiving an image from a participant;
- instructions for converting the image to be one of a plurality of video effects options;
- instructions for receiving a selection by the participant of the video effects UI element;
- in response to receiving the selection, instructions for displaying the plurality of video effects options for modifying an appearance of the video corresponding to the participant and/or modifying a visual representation of the participant within the video;
- instructions for receiving a first selection by the participant of a first video effect from the plurality of video effects options for a first video provided to a first participant;
- instructions for receiving a subselection for customizing at least an amount of the first video effect to be applied, the amount of the first video effect comprising: an intensity of effect for the first video effect to be applied, and an opacity amount for the first video effect to be applied, wherein the intensity of effect for the first video effect to be applied defines an amount of modification made to a visual representation of a participant;
- instructions for receiving a second selection by the participant of a second video effect from the plurality of video effects options for a second video provided to a second participant;
- instructions for applying, in real time or substantially real time, the first video effect in the selected amount to the first video; and
- instructions for applying, in real time or substantially real time, the second video effect to the second video.

* * * * *